United States Patent [19]

Cronin et al.

[11] 4,044,754
[45] Aug. 30, 1977

[54] SOLAR COLLECTOR AUTOMATIC FREEZE PROTECTION SYSTEM

[75] Inventors: Paul W. Cronin, Andover; Peter H. Ottmar, Attleboro, both of Mass.; Ernest F. Root, Nashua, N.H.; Harry M. Simmons, Reading, Mass.

[73] Assignee: Itek Corporation, Lexington, Mass.

[21] Appl. No.: 684,519

[22] Filed: May 10, 1976

[51] Int. Cl.² .............................................. F24J 3/02
[52] U.S. Cl. .................................... 126/271; 137/59; 126/270
[58] Field of Search ............... 126/271, 270; 237/1 A, 237/66, 80; 137/59, 60, 61, 62

[56] References Cited

U.S. PATENT DOCUMENTS

| | | | |
|---|---|---|---|
| 2,469,496 | 5/1949 | Christenson | 126/271 |
| 3,970,069 | 7/1976 | Pickett | 126/271 |
| 3,986,489 | 10/1976 | Schlesinger | 126/271 |
| 3,989,032 | 11/1976 | Harrison | 126/271 |

Primary Examiner—Kenneth W. Sprague
Assistant Examiner—James C. Yeung
Attorney, Agent, or Firm—Homer O. Blair; Robert L. Nathans; Gerald H. Glanzman

[57] ABSTRACT

An automatic freeze protection system for solar energy collector apparatus. The apparatus includes a solar collector for circulating water or another fluid to be heated by the sun. Sensor means are provided within the collector to monitor the temperature of the water, and whenever it approaches the freezing point, the sensor will automatically actuate a valve means to rapidly drain the water from the collector. When the temperature within the collector thereafter rises to a predetermined safe level, the sensor means will again automatically actuate the valve means to refill the collector with fresh water to be heated. The system provided thus avoids the need for anti-freeze or other freeze protection materials suggested by the prior art as well as isolated water loops, heat exchangers and other expensive safety equipment necessitated thereby.

6 Claims, 1 Drawing Figure

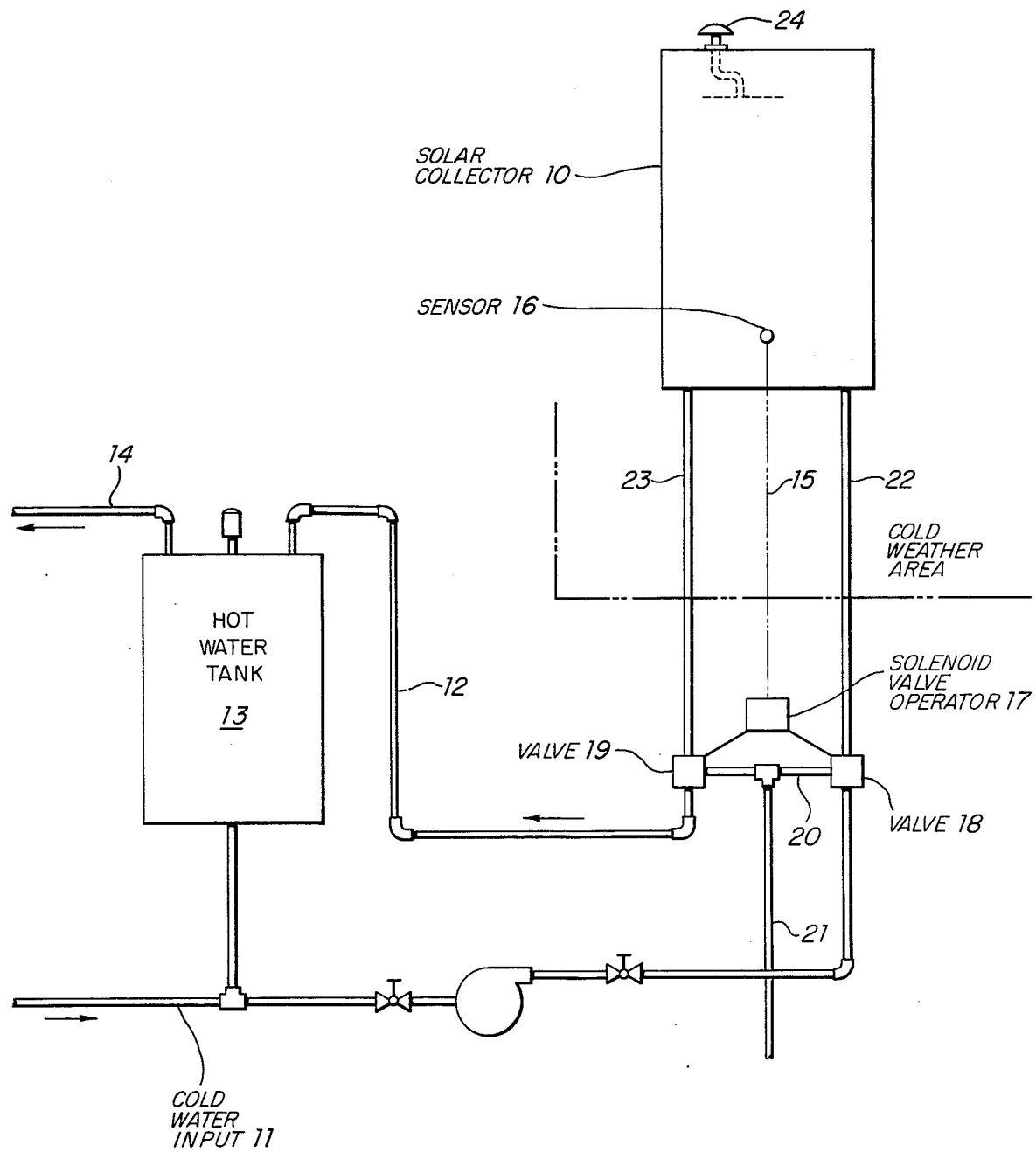

SOLAR COLLECTOR AUTOMATIC FREEZE PROTECTION SYSTEM

BACKGROUND OF THE INVENTION

1. Field of the Invention

The present invention relates generally to the field of solar energy utilization apparatus, and more particularly, to an automatic freeze protection system for use in solar energy collector systems.

2. Description of the Prior Art

Owing to the energy crisis, a great deal of research activity is presently being conducted throughout the world with respect to solar collectors for heating fluids for applications in the fields of water heating, space heating, air conditioning, etc., to thereby reduce the quantities of conventional fuels consumed. While numerous solar collectors may be found in the prior art, there is a continuing effect to produce collectors which have very high thermal efficiencies and yet which are relatively inexpensive to fabricate. The use of inexpensive materials, and the employment of labor saving techniques is of paramount importance in facilitating the widespread use of the collectors, and hence, in reducing the quantities of conventional fuel consumed.

The present invention is directed towards a problem which is encountered in cold weather climates. Specifically, in those areas wherein outside temperatures may drop near or below the freezing point of water, some form of protection must be provided to prevent water from freezing up within the collector or within the plumbing leading to and from the collector as its expansion by freezing can obviously cause very severe damage to the entire system.

One solution to this problem which has been suggested in the prior art is to add anti-freeze to the water in the collector. Anti-freeze, however, is not only expensive in and of itself, but is also poisonous and, accordingly, when used, necessitates the addition of costly safety equipment to ensure that the anti-freeze/water solution will not enter into the main water supply of the home of other building. For example, it is usually necessary to isolate the anti-freeze/water mixture from the main water supply by maintaining it in a closed loop system, and to then use the heated anti-freeze/water mixture to heat the main water supply through appropriate heat exchange means. This will not only raise the cost of the system, but will also lower its efficienct. Furthermore, notwithstanding the isolation of the anti-freeze/water mixture, there is always some danger that a certain amount of leakage into the main water supply could occur. For this reason, some states have forbidden its use in solar energy systems.

Yet a further disadvantage of such systems is the fact that, although the anti-freeze/water mixture will not freeze, it can drop to quite a low temperature during the night. Accordingly, when the sun comes up in the morning and begins heating the water, substantial time is needed to heat the cold fluid to a usable temperature, and this also results in a significant loss in efficiency.

SUMMARY OF THE PREFERRED EMBODIMENTS

In accordance with the present invention, a solar energy collector system that avoids many of the inadequacies inherent in the prior art is provided. Specifically, in accordance with the present invention, a system is provided that avoids the need for anti-freeze and, hence, of the closed loop water system, heat exchangers, and other desirable safety equipment necessitated thereby. Instead, with the present invention, only a single water circulating system is required with water circulating from the collector directly into a water heater for storage or utilization.

In order to prevent the water from freezing up in the collector when the temperature drops near or below the freezing point, an automated freeze protection system is provided. Specifically, a temperature sensor is supported, preferably within the collector, and when the temperature within the collector approaches the freezing point of water, the sensor will automatically actuate appropriate valve means to rapidly drain the water from the collector. This normally will occur only at night or on very cloudy days when there is no available sunlight, so that there is essentially no loss in operating efficiency as compared with more conventional systems. When the temperature in the collector thereafter rises to a predetermined level, the sensor means will again automatically actuate the valve means to refill the collector with fresh water and the system will be back in operation.

Thus, the present invention provides a fully automated system that will permit effective solar energy collection, while at the same time, avoid the need for anti-freeze and the expense and risks introduced thereby.

A further advantage obtained is that the water used to refill the collector can be ordinary house water which is usually at a temperature of about 50° F. Thus, the water will be relatively warm to start with and, accordingly, can more rapidly be heated up by the sun to utilization temperatures than a fluid tht may have been subjected to sub-freezing temperatures for several hours. Yet other features and advantages of the invention will be set out hereinafter in conjunction with the detailed description of the drawings.

BRIEF DESCRIPTION OF THE DRAWINGS

The FIGURE illustrates, in schematic form, the freeze control system according to a presently most preferred embodiment of the invention.

DETAILED DESCRIPTION OF THE PREFERRED EMBODIMENT

The FIGURE illustrates, in schematic form, the automatic freeze protection system according to a presently preferred embodiment of the invention. Reference number 10 identifies the solar collector which is mounted outside the house or other building to receive the heating rays of the sun. Its specific construction is not important to the present invention and any one of a number of collector designs may be employed. One suitable collector, however, is described in detail in co-pending U.S. Patent Application Ser. No. 652,023, filed on Jan. 26, 1976 by Ernest F. Root and entitled SELF-JIGGING METHOD OF FABRICATING SOLAR COLLECTOR HEAT TRAP FROM FLEXIBLE PLASTIC ROLL MATERIAL and in co-pending U.S. Patent Application Ser. No. 653,819, filed on Jan. 30, 1976 by Ernest F. Root, Serge Kunica and Harry M. Simmons, and entitled HIGHLY EFFICIENT SOLAR COLLECTOR INCLUDING MEANS FOR PREVENTING COVER PLATE FLUID CONDENSATION. This collector, basically, comprises a network of conduits through which water or other fluid is circulated to be heated by the sun.

The system, as illustrated in the FIGURE, further includes a plumbing system for carrying water to and from the collector as required. Specifically, the system includes a cold water input line 11 for carrying water from a source, not shown, but conveniently from an ordinary city water line, into the solar collector to be heated; and a hot water output line 12 for carrying heated water out of the collector to a hot water tank 13 fo storage and utilization through pipe 14 as is understood in the art. In ordinary operation, hot water from the collector will be transferred to the tank 13 through line 12 from lines 23 and/or 22 as needed and be replaced by fresh water from line 11 and lines 22 and 23 in a conventional manner which need not be discussed in detail herein.

Because anti-freeze or other harmful or potentially harmful materials are not used in the present invention, the heated water in the collector can be directly utilized in any desired manner as discussed above.

Because anti-freeze or the like is not used, however, and because the collector and some of the plumbing is located outside in a potentially cold weather area (as indicated in the FIGURE), it is necessary that the water be prevented from freezing up as this will cause severe problems. Thus, the present invention provides an automatic freeze control system for this purpose. Specifically, the present invention provides a sensor means 16 mounted within the collector to continuously monitor the temperature therein. Sensor 16 is electrically coupled through electrical coupling 15 to a double 3-way solenoid valve operator 17 which, in turn, actuates valves 18 and 19 in the input and output lines 11 and 12 of the collector.

Whenever the temperature within the collector approaches a predetermined level near the freezing point of water, e.g., around 38°–40° F, sensor 16 will automatically actuate operator 17 to move valves 18 and 19 to the position to drain the collector through drain pipe 21 via lines 22, 23 and 20. Once drained, the collector and plumbing is, of course, in no danger of being damaged by freezing temperatures.

In order to ensure that the water will drain rapidly and smoothly from the collector, an insulated air relief valve 24 (e.g., a ball valve), is provided and is mounted at the highest point of the system to allow air to enter into the water lines to help drainage.

As long as the temperature in the collector remains below a safe level, the collector will remain drained and inoperative. When, however, the temperature rises to a certain predetermined safe level, e.g., 40°–50° F, sensor 16 will again automatically actuate operator 17 to return valves 18 and 19 to their operating position wherein the collector will be refilled with water through lines 11, 22 and/or 23 for normal operation. Air relief valve 24 is also positioned to allow air to escape from the collector during refilling to avoid the formation of air pockets in the system.

Thus, the system provided will rapidly and automatically drain the collector whenever the temperature therein drops to a firt predetermined danger level, and will thereafter automatically refill the collector for operation when the temperature thereafter rises to a second predetermined safe level.

The sensor 16 itself may take a variety of forms. In the present embodiment, it comprises a bimetallic disc sold by Texas Instruments, Inc. under the tradename "Klixon". When the temperature drops to the first predetermined level, the disc will snap away from a contact to open the circuit to the operator 17 and cause the valves to switch and drain the collector. When the temperature thereafter rises to the second predetermined level, the disc will automatically snap back to close the switch and return the valves to their operating position. In other words, the system is designed such that the circuit between the sensor and the valve operator is closed and the solenoid valves are actuated during normal operating conditions, while the circuit will be open during periods when the collector is drained and not operating. This is an important feature because should a power failure occur, the valves will automatically drain the collector to ensure against the accidental freezing of water within the collector during such periods.

The sensor is preferably positioned in the collector near the bottom thereof and close to the water lines where the coldest temperatures will be encountered.

In summary, the present invention provides a highly efficient solar energy system designed for use in cold weather climates. The system provided avoids the need for anti-freeze or other materials to prevent water freeze-up, and, in doing so, also eliminates the need for a closed loop water system in the collector as suggested in the prior art, together with heat exchangers to transfer heat from the collector water to the house water, as well as other safety equipment often necessitated by the use of anti-freeze. Because heat exchangers are not needed, greater efficiency is obainable at reduced expense.

While what has been described is a presently most preferred embodiment, it should be recognized that the invention may take many other forms. For example, the system could also be provided with appropriate by-pass lines to by-pass the valves 18 and 19. These lines can be manually inserted into the fluid circuit during the summer months when there is no danger of freezing. This will permit the solenoid valves to be shut off for energy conservation. Also, it should be understood that many other types of valves and sensors could be used with the invention if so desired. Finally, if should be emphasized that the invention can be used in a wide variety of applications in addition to domestic hot water systems. For example, it could conveniently be employed in pool heating, space heating and other applications.

Because many additions, omissions and modifications can be made to the present invention, it should be understood that the invention should be limited only insofar as required by the scope of the following claims.

What is claimed is:

1. A freeze protection system for solar collectors comprising:
    a. solar collector means for holding a fluid to be heated;
    b. input means for supplying fluid to said collector means;
    c. output means for removing fluid from said collector means;
    d. sensor means for automatically monitoring the temperature of said collector means;
    e. valve means coupled to said output means for automatically removing fluid from said collector means when the temperature of said collector means drops to a first predetermined level to prevent fluid from freezing up within said collector means; and
    f. switch means coupling said sensor means to said valve means and actuated by said sensor means, said switch means being normally closed when said collector means is filled with fluid and which automatically opens when the temperature in said collector means drops to said first predetermined level for actuating said valve means for automatically removing fluid from said collector means.

2. A system as recited in claim 1 and further including air relief valve means positioned adjacent the top of said collector means for allowing air into said collector means to assist in draining said collector means.

3. A system as recited in claim 1 and further including means for supporting said sensor means adjacent the bottom of said collector means where the coolest temperatures will be encountered.

4. A system as recited in claim 1 and further including means for automatically supplying fluid to said collector means when the temperature within said collector means thereafter rises to a second predetermined level.

5. A freeze protection system for solar collectors including:
   a. solar collector means for holding a fluid to be heated;
   b. input means for supplying fluid to said collector means to be heated therein;
   c. output means for removing heated fluid from said collector means for direct utilization; and,
   d. means for automatically protecting said solar collector against freezing, said protection means comprising:
      1. sensor means for automatically monitoring the temperature of said collector means;
      2. solenoid valve means for draining fluid from said collector means; and,
      3. means coupling said sensor means to said solenoid valve means for automatically draining said collector means when the temperature therein drops to a first predetermined level, said coupling means comprising switch means which is normally closed when said collector means is filled with fluid and which automatically opens when said temperature in said collector means drops to said first predetermined level to drain said collector means.

6. A system as recited in claim 5 wherein said sensor means further includes means coupled to said input means for automatically supplying fluid to said collector means when the temperature therein thereafter rises to a second predetermined level.

* * * * *